US010259607B2

(12) United States Patent
Diaz Guerrero (10) Patent No.: US 10,259,607 B2
(45) Date of Patent: Apr. 16, 2019

(54) ASEPTIC ROBOTIC FILLING SYSTEM AND METHOD

(71) Applicant: Vanrx Pharmasystems Inc., Burnaby (CA)

(72) Inventor: Carlos Alberto Diaz Guerrero, New Westminster (CA)

(73) Assignee: VANRX PHARMASYSTEMS INC., Burnaby (CA)

( * ) Notice: Subject to any disclaimer, the term of this patent is extended or adjusted under 35 U.S.C. 154(b) by 0 days.

(21) Appl. No.: 15/199,766

(22) Filed: Jun. 30, 2016

(65) Prior Publication Data

US 2017/0121046 A1 May 4, 2017

Related U.S. Application Data

(60) Provisional application No. 62/247,717, filed on Oct. 28, 2015.

(51) Int. Cl.
*B65B 55/02* (2006.01)
*B65B 3/00* (2006.01)
(Continued)

(52) U.S. Cl.
CPC .......... *B65B 55/027* (2013.01); *B65B 3/003* (2013.01); *B65B 7/28* (2013.01); *B65B 7/2821* (2013.01);
(Continued)

(58) Field of Classification Search
CPC ......... B65B 55/027; B65B 3/003; B65B 7/28; B65B 7/2821; B65B 43/54; B65B 57/02;
(Continued)

(56) References Cited

U.S. PATENT DOCUMENTS 3,685,517 A * 8/1972 Reynolds ............ A61M 1/0096
141/61
3,778,617 A * 12/1973 Calhoun ................. B07C 5/126
250/223 B
(Continued)

OTHER PUBLICATIONS

Canadian Intellecual Property Office, International Search Report and Written Opinion for PCT/IB2016/001739, dated Mar. 8, 2017.

*Primary Examiner* — Alexander M Valvis
*Assistant Examiner* — Eduardo R Ferrero
(74) *Attorney, Agent, or Firm* — Kevin R. Erdman; Brannon Sowers & Cracraft PC (57) ABSTRACT

In one general aspect, a system for aseptically filling a tray of pharmaceutical containers with a pharmaceutical product is disclosed, which consists of an aseptic chamber, one or more articulated arms within the chamber, a sensor aseptically disposed with respect to the chamber, and a controller. The controller determines the locations of openings of the containers based on the image information from the sensor, and automatically guides one of the arms to fill the containers with the product. In order to obtain suitable contrast for accurately identifying the openings, an illuminator illuminates the tray with substantially collimated light. The sensor images the tray and containers using collimated light reflected from a reflective surface such as a retroreflector under the tray. To this end, the sensor may be disposed at a large enough distance from the retroreflector to collect largely the retroreflected light, or the sensor may employ a telecentric lens or a Fresnel lens. Further articulated arms move the tray and stopper the containers.

26 Claims, 9 Drawing Sheets

(51) Int. Cl.
*B65B 43/54* (2006.01)
*B65B 7/28* (2006.01)
*B65B 57/06* (2006.01)
*H04N 5/225* (2006.01)
*B65B 57/02* (2006.01)
*G01B 11/24* (2006.01)

(52) U.S. Cl.
CPC .............. *B65B 43/54* (2013.01); *B65B 55/02* (2013.01); *B65B 57/06* (2013.01); *H04N 5/2256* (2013.01); *H04N 5/2257* (2013.01); *B65B 57/02* (2013.01); *G01B 11/24* (2013.01)

(58) Field of Classification Search
CPC ........ B65B 57/06; G01N 21/24; G01N 21/88; G01N 21/90; H04N 5/2256; H04N 5/2257; H04N 5/2255; G01V 8/00; G01V 8/12; G01V 8/14; G01B 11/24
See application file for complete search history.

(56) References Cited

U.S. PATENT DOCUMENTS

| | | | | |
|---|---|---|---|---|
| 4,011,447 A | * | 3/1977 | Henderson | G01D 5/342 250/214 A |
| 4,201,910 A | * | 5/1980 | Copeland | G01V 8/14 250/216 |
| 4,530,202 A | | 7/1985 | Powell et al. | |
| 4,649,270 A | * | 3/1987 | Goldenberg | G01V 8/14 250/221 |
| 4,859,862 A | * | 8/1989 | Planke | G01B 11/2433 250/559.05 |
| 4,967,069 A | * | 10/1990 | Yamakawa | G01N 21/95684 250/221 |
| 4,978,843 A | * | 12/1990 | Yamakawa | G01V 8/14 250/216 |
| 5,084,620 A | * | 1/1992 | Butturini | G01N 35/00029 250/338.5 |
| 5,104,225 A | * | 4/1992 | Masreliez | G01D 5/38 250/237 G |
| 5,130,531 A | * | 7/1992 | Ito | G01V 8/14 250/216 |
| 5,267,014 A | * | 11/1993 | Prenninger | G05B 19/18 348/135 |
| 5,490,643 A | * | 2/1996 | Jano | F41G 7/305 244/3.11 |
| 5,772,313 A | * | 6/1998 | Taylor | F21V 5/04 362/298 |
| 5,898,169 A | * | 4/1999 | Nordbryhn | G01B 11/2433 250/223 B |
| 6,046,462 A | * | 4/2000 | Yokajty | G01N 21/8901 250/223 B |
| 6,115,128 A | * | 9/2000 | Vann | G01B 11/002 250/559.38 |
| 6,227,265 B1 | * | 5/2001 | Skell | B67D 1/1236 141/198 |
| 6,593,561 B2 | * | 7/2003 | Bacarella | G01J 1/4228 250/208.1 |
| 6,946,643 B1 | * | 9/2005 | Fayfield | G01V 8/14 250/221 |
| 7,148,961 B1 | * | 12/2006 | Ringlien | G01N 21/90 356/240.1 |
| 7,242,027 B2 | * | 7/2007 | Schranz | H01L 27/14621 257/225 |
| 8,126,325 B2 | * | 2/2012 | Lunde | G07F 7/0609 209/522 |
| 8,170,322 B2 | * | 5/2012 | Pine | G06K 9/2036 348/370 |
| 2006/0048844 A1 | | 3/2006 | Merrill et al. | |
| 2006/136095 A1 | | 6/2006 | Rob et al. | |
| 2006/0180748 A1 | * | 8/2006 | Schoser | G01D 5/2457 250/221 |
| 2008/0282566 A1 | * | 11/2008 | Holzapfel | G01B 11/002 33/707 |
| 2009/0109447 A1 | * | 4/2009 | Winterot | G01B 11/24 356/601 |
| 2009/0223592 A1 | | 9/2009 | Procyshyn et al. | |
| 2009/0268460 A1 | * | 10/2009 | Van Gorkom | H01L 25/0753 362/244 |
| 2010/0204713 A1 | | 8/2010 | Ruiz Morales | |
| 2010/0241270 A1 | | 9/2010 | Eliuk et al. | |
| 2010/0283999 A1 | * | 11/2010 | Takeyama | G01M 11/0257 356/239.2 |
| 2011/0012746 A1 | * | 1/2011 | Fish, Jr. | G08B 5/38 340/691.6 |
| 2013/0292554 A1 | * | 11/2013 | Meinherz | G01V 8/14 250/221 |
| 2014/0196411 A1 | * | 7/2014 | Procyshyn | B25J 21/02 53/467 |
| 2014/0210967 A1 | * | 7/2014 | Kirkerud | G07F 7/0609 348/61 |
| 2014/0268123 A1 | * | 9/2014 | Juvinall | G01N 21/9081 356/239.4 |
| 2016/0184986 A1 | * | 6/2016 | Procyshyn | B25J 9/0009 74/490.05 |
| 2016/0251206 A1 | * | 9/2016 | Gold | B65B 57/02 53/492 |

* cited by examiner

ASEPTIC ROBOTIC FILLING SYSTEM AND METHOD

CROSS REFERENCE TO RELATED APPLICATIONS

The subject matter of this application relates to that disclosed in U.S. patent application Ser. No. 13/744,408 filed Jan. 17, 2013, which is a divisional of U.S. patent application Ser. No. 12/393,183 filed Feb. 26, 2009 and claims the benefit of U.S. Provisional Patent Application Ser. No. 61/033,682, filed Mar. 4, 2008. All of these applications are herein incorporated by reference.

BACKGROUND OF THE INVENTION

Field of the Invention

The invention relates to automated filling systems and methods, including aseptic systems and methods for the filling of pharmaceutical containers with pharmaceuticals under controlled conditions.

Background

By its very nature, the production of sterile pharmaceuticals by humans can be problematic. Humans can be a large source of microbial contamination. Also, with increased potencies, some drugs can be hazardous in occupational exposure. For at least these reasons, robotics have been used in dosage manufacturing to limit human contact. Isolator technology, which provides a solid barrier between a process and humans, can also be used in dosage manufacturing to limit human contact.

To enable sterile processing, isolator technology has evolved to adapt various vapor and gas sterilization systems, thereby bringing about an advance in aseptic processing. Articulated cleanroom robots have been employed which utilize internal negative pressure with an exhaust to generate cleanroom capability. With the chemical sterilization and handling of potent drugs within the isolator, an internal negative pressure cleanroom with an exhaust is not generally feasible, due largely to the leakage potential.

Sterile manufacturing is performed by various companies, often outsourced companies, including small cleanroom facilities and large pharmaceutical facilities. Often, small cleanroom facilities are not optimally equipped for pharmaceutical filling operations, which can lead to a lower quality product and higher risk for the outsourcing company. Conversely, large pharmaceutical facilities with high-speed lines generally can produce a higher quality product, but have relatively limited flexibility with respect to batch size, variations of product, and timing.

SUMMARY OF THE INVENTION

In a first aspect, a system is provided for aseptically filling a tray of pharmaceutical containers with a pharmaceutical product, comprising: a chamber capable of maintaining an aseptic condition, an articulated filling arm disposed within the chamber, a sensor aseptically disposed with respect to the chamber and having a sensing cone within the chamber, and a controller in data communication with the sensor and with the filling arm and configured for: obtaining image information from the sensor, determining the locations of openings of the containers within the sensing cone based on the image information, and automatically guiding the filling arm to fill the containers with the product based on the locations of openings of the containers.

The system may further comprise a retroreflector aseptically disposed with respect to the chamber, wherein the retroreflector is further disposed to retroreflect to the sensor light perpendicularly impinging on the retroreflector. The system may further comprise an illuminator disposed to illuminate the retroreflector with substantially collimated light. The system may further comprise a holding arm for holding the tray, wherein the controller is in data communication with the holding arm, and the controller is configured for automatically guiding based on the image information the holding arm to position the tray in a location in a light path between the illuminator and the retroreflector. The controller may be configured for automatically guiding based on the image information the holding arm to position the tray The automatically positioning may be such that a planar surface of the tray is substantially perpendicular to the collimated light. The system may further comprise a stoppering arm for stoppering the containers, wherein the controller is in data communication with the stoppering arm, and the controller is configured for automatically guiding based on the image information the stoppering arm to stopper the containers.

The sensor may be disposed at a large enough distance from the retroreflector to collect largely the retroreflected light. The sensor may comprise the illuminator and an imager, wherein the illuminator is disposed annularly about the imager. The sensor may comprise an imaging detector, a fixed focal length lens, and a Fresnel lens. The illuminator for use with the Fresnel lens may be one that provides substantially monochromatic light. In other embodiments the sensor may comprise an imaging detector and a telecentric lens, wherein the imager detector is disposed to receive the retroreflected light through the telecentric lens.

In another aspect, a method is provided for aseptically filling pharmaceutical containers with a product, the method comprising establishing an aseptic condition within a chamber, maintaining the aseptic condition while providing within the chamber a tray holding within openings in the tray a plurality of pharmaceutical containers, automatically positioning the tray with the plurality of containers between an illuminator and a retroreflector, automatically illuminating the tray and containers with light from the illuminator, automatically obtaining image information about the tray and containers based on light reflected through the containers by the retroreflector, identifying based on the image information centers of openings of at least a portion of the plurality of containers, and automatically filling the at least a portion of the plurality of containers with the product based on the identified openings.

The method may further comprise automatically stoppering the openings of the at least a portion of the plurality of containers. The automatically stoppering may comprise operating an articulated stoppering arm to collect stoppers from known locations of stoppers, and operating the articulated stoppering arm to stopper the openings of the at least a portion of the plurality of containers.

The automatically illuminating the tray and containers may comprise illuminating the tray and containers with substantially collimated light. The automatically positioning the tray may comprise operating an articulated holding arm to automatically position the tray. The automatically positioning may be such that a planar surface of the tray is substantially perpendicular to the collimated light. The automatically filling may comprise operating an articulated filling arm to automatically fill the at least a portion of the plurality of containers.

The automatically obtaining image information may comprise imaging with a sensor disposed at a large enough distance from the retroreflector to collect largely the retroreflected light. In other embodiments, the automatically obtaining image information may comprise imaging the tray and containers using a telecentric lens. The automatically obtaining image information may in further implementations comprise imaging the tray and containers using a Fresnel lens and a fixed focal length lens. In using a Fresnel lens, the automatically illuminating the tray and containers with light may comprise automatically illuminating the tray and containers with substantially monochromatic light.

Systems according to the invention can help to automate sterile processing inside isolator units by allowing allow the accurate tracking of pharmaceutical containers and the accurate location of their openings. Such systems can perform this tracking in a highly robust and tolerant manner.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. Some drawings may exclude elements for the sake of clarity, the excluded elements being shown in other drawings. The flowcharts and screen shots are also representative in nature, and actual embodiments of the invention may include further features or steps not shown in the drawings. The exemplifications set out herein illustrate embodiments of the invention, in one form, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

Figure 1:
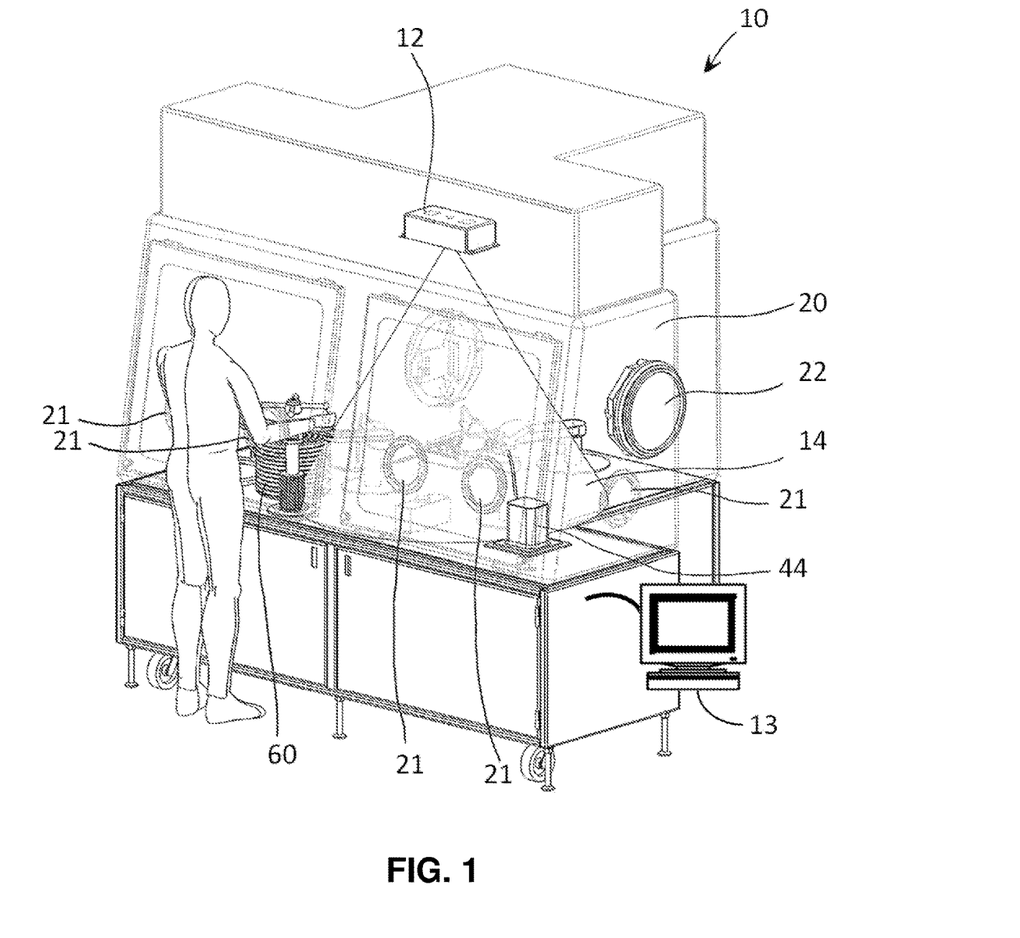
FIG. 1 is a perspective view of a robotic filling system according to embodiments of the disclosed subject matter.
Figure 2:
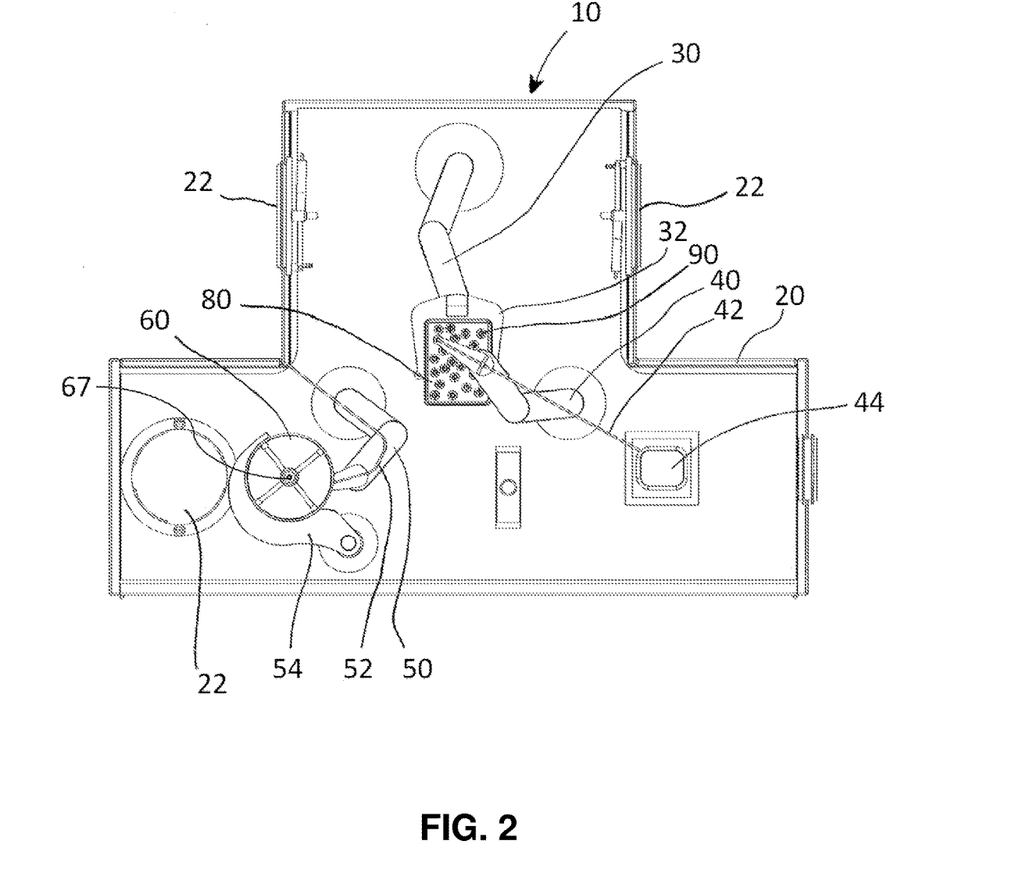
FIG. 2 is a plan view of a robotic filling system according to embodiments of the disclosed subject matter.

Referring to FIGS. 1 and 2, an aseptically sealed robotic filling system 10 is configured to fill containers 90 (see FIG. 2) with a product. The product may be, for example without limitation, at least one of a liquid product, a pharmaceutical product, or potentially toxic or otherwise harmful product. As will be described in more detail below, the filling system 10 can be configured to locate, target, and fill randomly placed containers 90 within a tray or nest 80, without the need for mechanical container handling parts, or other change parts for filling equipment. Many types of containers 90 are contemplated herein, including, but not limited to vials, syringes, bottles, beakers, test tubes, etc.

Filling system 10 may comprise a chamber 20 configured to maintain a desired environmental condition. For the sake of clarity, the internal details of chamber 20 are shown in plan view in FIG. 2. For example without limitation, chamber 20 may be an isolator chamber capable of maintaining an aseptic condition within chamber 20. Chamber 20 may comprise one or more ports 22 for access to the interior of the chamber 20. At least one port 22 may be, for example, a rapid transfer port to allow for aseptic transfer of articles from a transfer container, such as a transfer isolator, to chamber 20. In some embodiments, the at least one port 22 may be a rapid transfer port configured to mate with a door of the transfer container such that the unsterilized exterior surfaces mate against and attach to each other before opening. The mating may be configured such that the unsterilized exterior surfaces of the door and the at least one port 22 are contained against each other when the port 22 and door combination is opened. This arrangement limits contamination of the interior environments of the transfer container and the chamber 20.

Filling system 10 may comprise proximity sensors or other suitable devices capable of sensing when a transfer container is engaged with the at least one port 22. This arrangement prevents opening of the at least one port 22 while not engaged with a transfer container and avoids contamination of the interior environmental condition.

Chamber 20 may include one or more glove holes 21 disposed in the walls of the chamber 20. Glove holes 21 may be used to manually manipulate objects within chamber 20 without opening chamber 20 or otherwise compromising the environmental condition within chamber 20.

A filling arm 40 (See FIG. 2) may be disposed within the chamber 20. Filling arm 40 may be a compound articulated robotic arm. Filling arm 40 may comprise filling tubing 42 extending from a pump 44 to a point at an end of filling arm 40. An outlet of the filling tube 42 may include a valve, filling needle, or other flow control device to control discharge of the product from the filling tubing 42. The filling tubing 42 may extend from a reservoir and through pump 44. Pump 44 may be configured to selectively urge the product from the reservoir, through the filling tubing 42, and into the containers 90. Pump 44 may a peristaltic pump, such as a rotary or a linear peristaltic pump. Filling arm 40 is disposed and configured to position the outlet of filling tubing 42 over each container 90 to allow filling of containers 90 with the product. Controller 13 is in data communication with pump 44 in order to control pump 44.

Filling system 10 may include a sensor 12 for sensing containers 90 within chamber 20. Sensor 12 is disposed to sense openings of containers 90. The sensor 12 may be an optical sensor, a camera system, or a laser system. Sensor 12 may be mounted at a top surface of chamber 20 and is disposed to sense within the chamber 20 an area described by a field of view or sensing cone 14. Controller 13 is in data communication with sensor 12 to control sensor 12 and retrieve information from sensor 12. In some embodiments, optical sensor 12 may be configured to locate containers 90 within the field of view or sensing cone 14 and target centers of the openings of the containers 90. The locations of the sensed openings of the containers 90 may be used to guide filling arm 40 to fill containers 90 with the product. The targeted centers may be used by controller 13 for controlling filling arm 40. Controller 13 is in data communication with filling arm 40. Optical sensor 12 may be configured to perform a pre-fill inspection of containers 90 to determine if any containers are defective or otherwise unfit for filling. If a defective container is found, the container can be ignored during the filling process so as to reduce waste of product and limit potential leakage.

The structure, functions, use, and operation of filling arm 40 are described in detail in U.S. patent application Ser. No. 13/744,408 filed Jan. 17, 2013, which is a divisional of U.S. patent application Ser. No. 12/393,183 filed Feb. 26, 2009 and claims the benefit of U.S. Provisional Patent Application Ser. No. 61/033,682, filed Mar. 4, 2008. All of these applications are herein incorporated by reference. Filling arm 40 may be of differing configurations capable of functioning in the manners described in the present specification and in the above-mentioned U.S. patent application Ser. Nos. 12/393,183 and 13/744,408. Filling arm 40 may be a servo-driven robotic arm. Filling arm 40 may be controlled by controller 13.

A holding arm 30 may be disposed within the chamber 20 for transporting and holding the containers 90 within chamber 20. Holding arm 30 may be a compound articulated robotic arm. Controller 13 is in data communication with holding arm 30 for controlling holding arm 30. Holding arm 30 may be used to perform multiple tasks, including, for example, opening doors of ports 22 and transporting and holding containers 90. To this end, holding arm 30 may comprise an end effect tool 32. In some embodiments the end effect tool may be generally U-shaped, as shown in FIG. 2. In some embodiments, the end effect tool 32 may include different configurations depending upon the interactions and tasks required of the holding tool. Holding arm 30 an end effect tool 32 may be disposed and configured for opening and closing ports 22 to allow for containers 90 to enter and exit chamber 20. For example, a transfer isolator or other such transfer container may be used to transfer sterilized containers into chamber 20. In one embodiment, once a transfer isolator or other transfer container is attached to the port 22, as signaled by the proximity sensor or other such device, the controller 13 may control the holding arm 30 to open the port 22.

Holding arm 30 can be used to interact with a door of the at least one port 22 to open the door, thereby allowing the holding arm 30 to access the interior of the transfer isolator or transfer container, while generally maintaining a desired environmental condition within the chamber 20. In one example, the containers 90 are held on a tray 80 or other such holder configured to allow the holding arm 30 to pick up the tray 80. The end tool 32 may be extended into the transfer isolator or transfer container and positioned to pick up the tray 80 to transport it into the chamber 20. Once the tray 80 is transported within the chamber 20, the port 22 may be closed by the holding arm 30.

In another example, the port 22 may remain open, for instance, to replace the tray 80 of containers 90 once the containers 90 have been filled. In yet another example, once the containers 90 have been filled, the holding arm 30 may be used to open a port 22, as described above, and to place the tray 80 of filled containers 90 within a transfer isolator or other transfer container engaged thereto for removal of the filled containers 90 from within the chamber 20.

Referring to FIG. 2, once the tray 80 is received by the end effect tool 32, the holding arm 30 transports the tray 80 to a filling position within chamber 20. The filling position may be a location within the chamber 20 that is within the sensing cone 14 and within reach of the filling arm 40. Tray 80 may be positioned such that collimated light impinges perpendicularly on tray 80 and on the openings of containers 90.

Once the tray 80 of containers 90 is in the filling position, the sensor 12 can be activated to locate the containers 90 and target the openings of the containers 90. Pattern recognition software may be employed to analyze data from the sensor 12 to identify suitable filling locations corresponding to the openings of the containers 90. In this way, the containers 90 in various positions on the tray 80, including random positions, may be located and targeted by the sensor 12 and pattern recognition software and need not be positioned with any particular pattern or spacing. Additionally, such locating and targeting may be performed regardless of the size of the containers 90. The pattern recognition software may be implemented in controller 13. In other embodiments, the pattern recognition software may be implemented in a computer or control module different from the controller 13 of the filling system 10. The positions of the containers 90 may be used to control the filling arm 40 to travel to the predetermined filling locations and dispense the product into the containers 90.

The structure, functions, use, and operation of holding arm 30 are described in detail in U.S. patent application Ser. No. 13/744,408 filed Jan. 17, 2013, which is a divisional of U.S. patent application Ser. No. 12/393,183 filed Feb. 26, 2009 and claims the benefit of U.S. Provisional Patent Application Ser. No. 61/033,682, filed Mar. 4, 2008. All of these applications are herein incorporated by reference. Holding arm 30 may be of differing configurations capable of functioning in the manners described in the present specification and in the abovementioned U.S. patent application Ser. Nos. 12/393,183 and 13/744,408. Holding arm 30 may be a servo-driven robotic arm. Holding arm 30 may be controlled by controller 13.

A stoppering arm 50 may be disposed within the chamber 20 and configured to pick up and place stoppers or other closures in the openings of the containers 90. Controller 13 is in data communication with stoppering arm 50 for controlling stoppering arm 50. Closures contemplated for use with the filling system 10 include, without limitation, lyophilization stoppers, serum stoppers, syringe stoppers, and the like. Stoppering arm 50 may comprise a gripping implement (not shown) at the end thereof. Stoppering arm 50 may comprise tubing 52 extending from a vacuum source to an end of the stoppering arm 50. The tubing 52 may connect to the gripping implement, allowing the gripping element to be actuated by pulling of a vacuum through the tubing 52. The application and removal of vacuum on tubing 52 may be controlled by controller 13 via a suitable vacuum pump (not shown). The gripping implement may comprise mechanical grasping members, such as mechanically-actuated fingers or other such mechanical grasping mechanisms.

Stoppering arm 50 may be configured and disposed to pick up stoppers from a stopper source. In one embodiment shown in FIG. 2, the stopper source is a stopper disc stack 60 comprising a stack of one or more stopper discs stacked on a spindle 67 and axially slidable along the spindle 67. The stopper discs may be configured to retain a plurality of stoppers. Filling system 10 may include a disc holder arm 54 to pick up discs from disc stack 60 after all the stoppers or other closures have been removed therefrom to thereby expose the stoppers or other closures of other discs lower down in the disc stack 60. Controller 13 is in data communication with disc holder arm 54 for controlling disc holder arm 54. The stopper discs, stoppers, the arrangement of stoppers on discs, and the method by which the stopper arm 60 and disc holder arm 54 are employed to obtain stoppers from the stopper disc stack to stopper containers 90 are described in detail in U.S. patent application Ser. No. 13/744,408 filed Jan. 17, 2013, which is a divisional of U.S. patent application Ser. No. 12/393,183 filed Feb. 26, 2009 and claims the benefit of U.S. Provisional Patent Application Ser. No. 61/033,682, filed Mar. 4, 2008. All of these applications are herein incorporated by reference. Stoppering arms 50 may be of differing configurations capable of functioning in the manners described in the present specification and in the abovementioned U.S. patent application Ser. Nos. 12/393,183 and 13/744,408. Stoppering arm 50 may be a servo-driven robotic arm.

Figure 3:
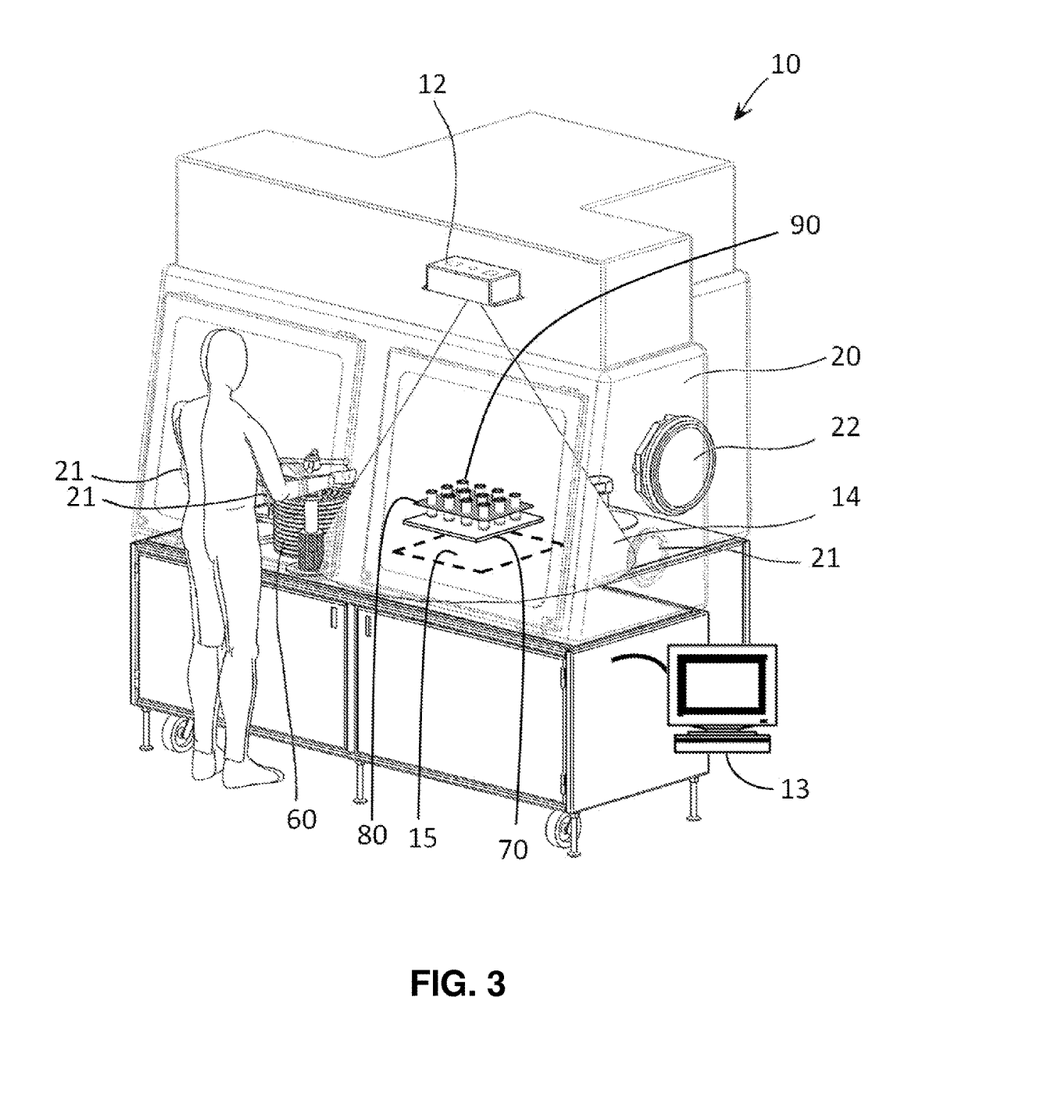
FIG. 3 is another perspective view of a robotic filling system according to embodiments of the disclosed subject matter.

FIG. 3 shows the sensing aspects of filling system 10 in more detail. For the sake of clarity, internal items to chamber 20 that are not immediately relevant to sensing and that may obscure the sensing subsystem and its working are not shown. In this respect, the holding arm 30, filling arm 40, stoppering arm 50, and disc holder arm 54, for example, are not shown in FIG. 3, but are instead shown in detail in FIG. 2. In FIG. 3, pharmaceutical containers 90 are held in tray 80 above or on a retroreflector 70. The details of retroreflector 70 are discussed later at the hand of FIG. 7. Retroreflector 70 ensures that adequate light returns toward sensor 12 to enable the imaging of the openings of containers 90 to a degree of accuracy that allows their centers to be determined accurately enough to guide filling arm 40 to fill containers 90 with the product. While a retroreflector is presently preferred, a less reflective surface, such as a white surface, may be sufficient for some applications.

Figure 4:
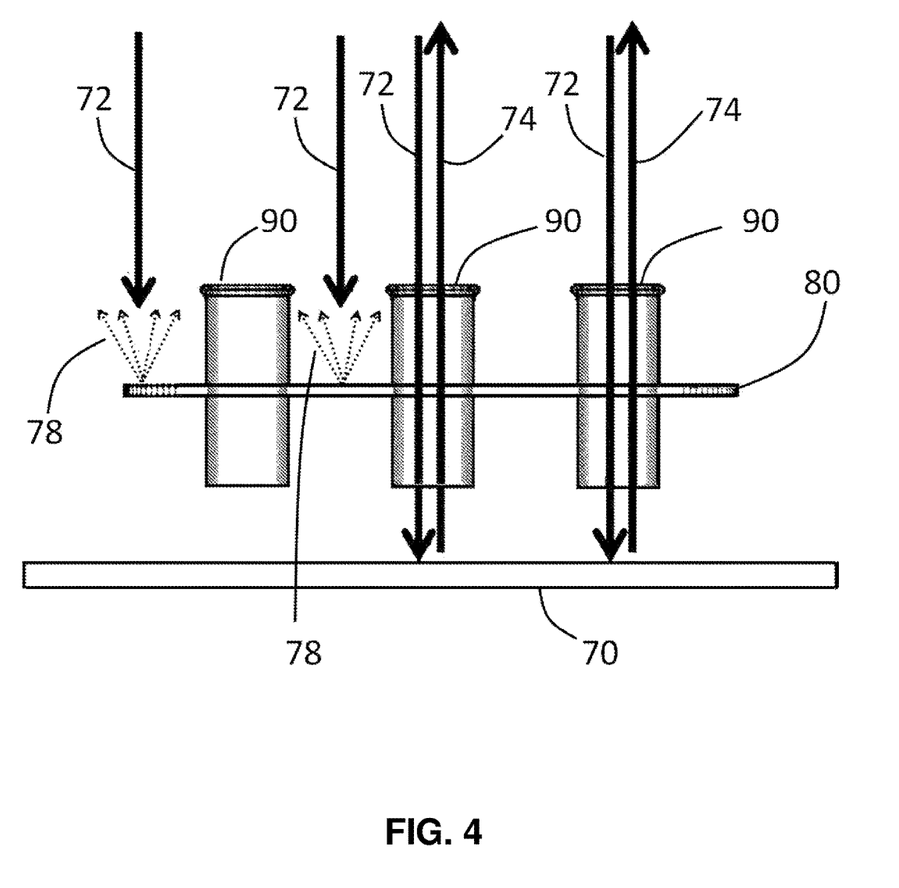
FIG. 4 is diagram showing the use of substantially collimated light in the functioning of a sensor of the robotic filling system of FIG. 3.

In FIG. 4 substantially collimated light 72 from a suitable illuminator, later discussed, is substantially perpendicularly incident on tray 80 holding pharmaceutical containers 90 and is reflected in multiple directions as generally reflected light 78 by tray 80. The light reflected directly back perpendicular to the tray 80 is thus much reduced in intensity. The portion of the substantially collimated light that is perpendicularly incident on containers 90 is transmitted through containers 90 and the bulk of this transmitted light is reflected back through containers 90 by retroreflector 70 as retroreflected light 74. As long as the incident light is suitably collimated, retroreflected light 74 will allow the formation of images by sensor 12 of FIG. 3 in which the container openings will exhibit high contrast with respect to significantly darker tray 80, the image of which relies on much less intense generally reflected light 78. This contrast allows for accurate determination of the centers of the openings in containers 90. Suitable methods for determining the centers of the containers 90, such as software based image analysis and pattern recognition, are well-established and will not be discussed further in this specification. The illumination is considered "substantially collimated" if it produces enough contrast by the above means to allow the openings of containers 90 to be unequivocally delineated in the software employed for image analysis. This allows a limited degree of divergence or convergence in incident illumination, which is dependent on the distance of the openings of the containers 90 from retroreflector 70.

Figure 5:
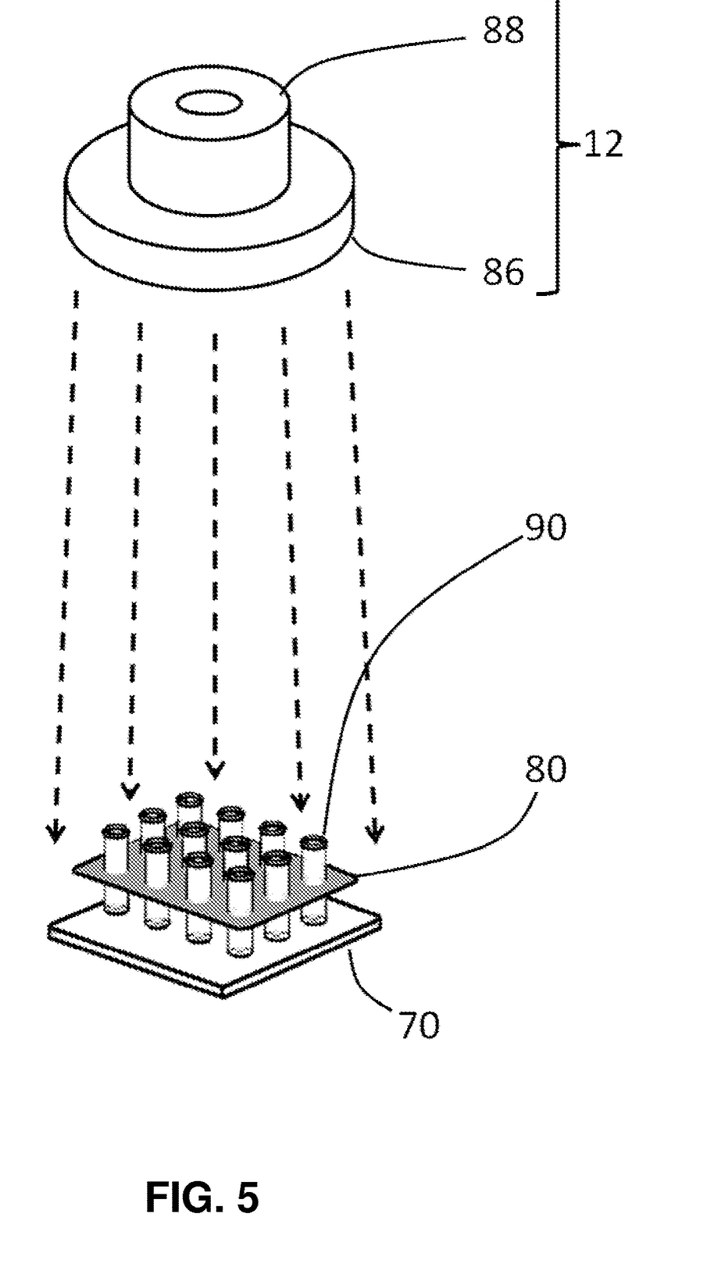
FIG. 5 shows a nest of pharmaceutical containers illuminated with substantially collimated light from an illuminator annularly disposed with respect to a sensor as per an embodiment of the disclosed subject matter.

FIG. 5 shows one embodiment of the illumination and imaging principle depicted in FIG. 4. In FIG. 5 sensor 12 comprises an imager 88 and an illuminator 86 annularly disposed about imager 88. By making the surface area of the illuminator large enough and locating the sensor 12 suitably far from tray 80, it may be ensured that the light impinging on the combination of tray 80 and pharmaceutical containers 90 is collimated to a degree that is suitable for the imaging to proceed by the mechanism described at the hand of FIG. 4. The challenge in imaging the openings of the containers is generally not primarily one of either resolution or enough light, but rather one of suitable contrast and depth of focus. In this embodiment the sensor 12 is located far enough from tray 80 to ensure that substantially collimated light illuminates tray 80. This arrangement also relaxes the demands on any imaging lens in imager 88 and avoids having complex and expensive lenses exposed to the gases and vapors employed to render the interior of chamber 20 aseptic. To this end, sensor 12 in its various embodiments may be aseptically disposed in the roof of chamber 20 by, for example without limitation, disposing it behind a transparent window sealed aseptically to the roof of chamber 20. In all contemplated arrangements, sensor 12 is aseptically disposed with respect to chamber 20, whether interior or exterior to chamber 20.

Figure 6:
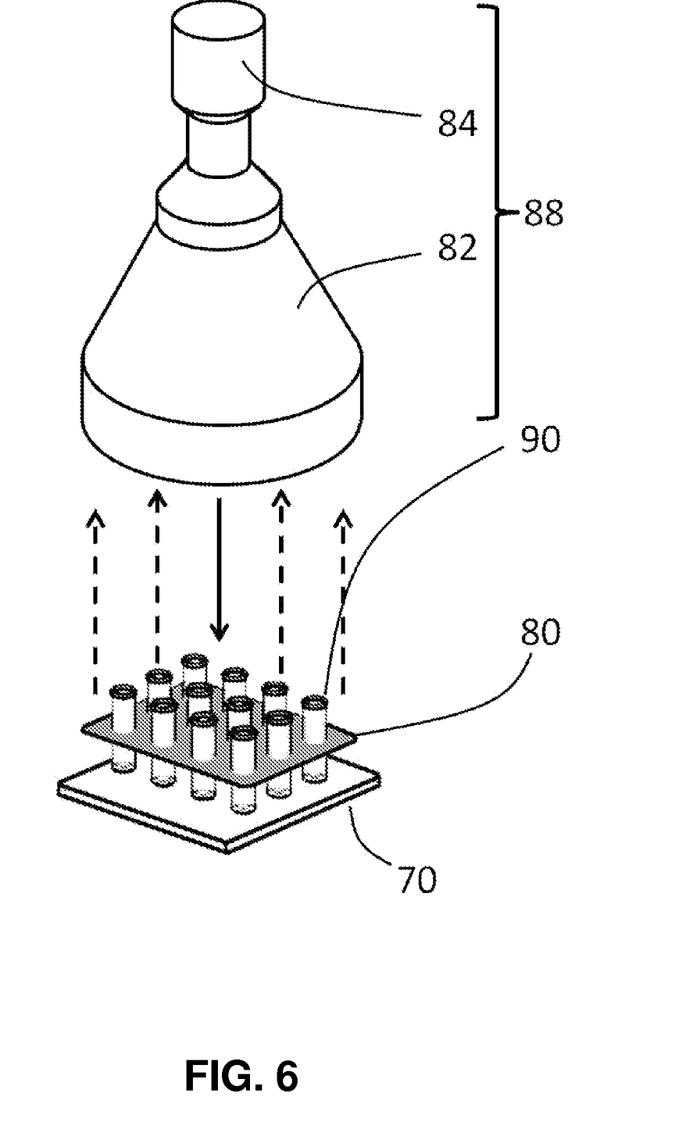
FIG. 6 shows a nest of pharmaceutical containers imaged by a sensor employing a telecentric lens as per an embodiment of the disclosed subject matter.

FIG. 6 shows another embodiment of the imaging aspect of system 10. In FIG. 6 imager 88 comprises an imaging detector 84 and a telecentric lens 82. Light from a suitable source (not shown) is made to impinge on tray 80 and is reflected as in FIG. 4. This embodiment relies on the telecentric nature of the lens to ensure that the image is formed from light impinging substantially perpendicularly on lens 82, and therefore passing through its aperture, rather than on the distance of the lens from tray 84 as in the embodiment of FIG. 5. A lens is sufficiently telecentric for a given system if it produces enough contrast by the above means to allow the openings of containers 90 to be unequivocally delineated in the software employed for image analysis within its useful range in the system.

Figure 7:
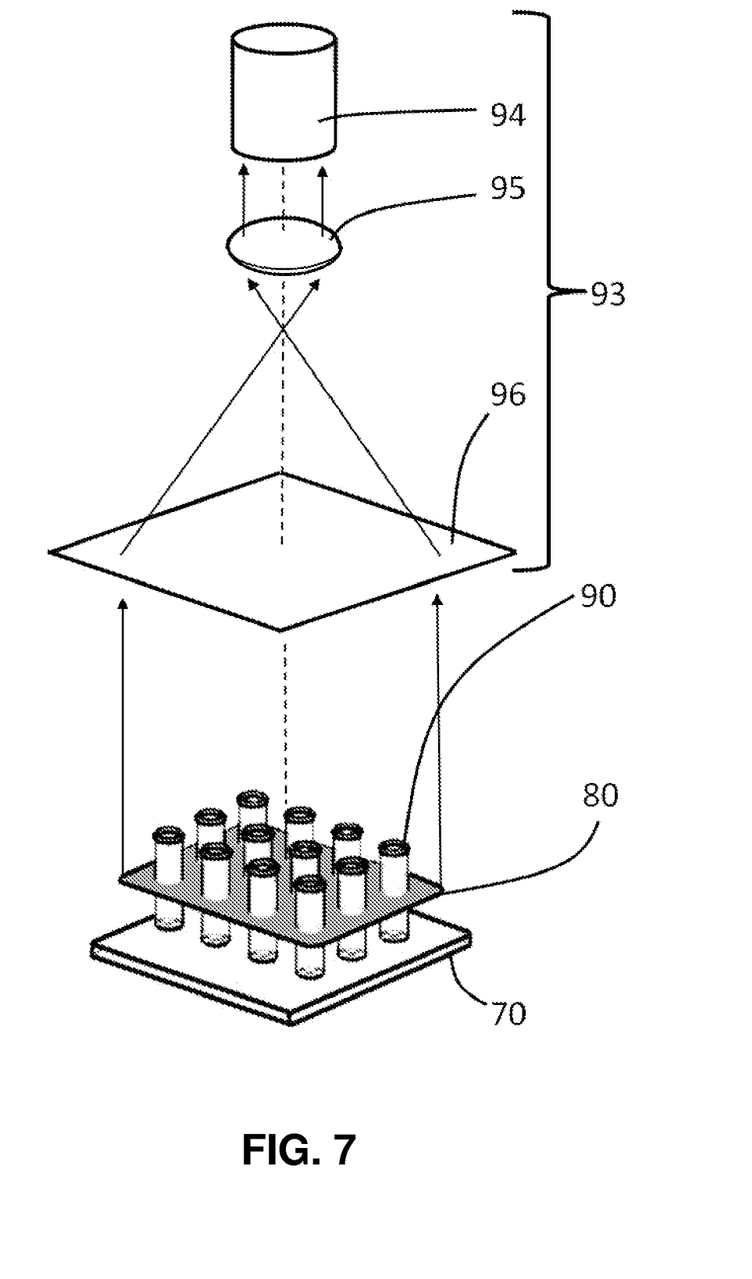
FIG. 7 shows a nest of pharmaceutical containers imaged by a sensor employing a Fresnel lens as per an embodiment of the disclosed subject matter.

FIG. 7 shows a further embodiment of the imaging aspect of system 10. In FIG. 7 imager 93 comprises an imaging detector 94, a fixed focal length lens 95, and a Fresnel lens 96 of at least the dimensions of the tray 80. The benefit of this solution lies in its inherent low cost. Fresnel lenses are vastly less costly than telecentric lenses of the same lens size. Substantially collimated light from a suitable source (not shown) is made to impinge perpendicularly on tray 80 and is reflected as in FIG. 4. To address the chromatic aberration inherent in Fresnel lenses, the illumination of tray 80 may done with substantially monochromatic light from suitable light emitting diodes.

Figure 8:
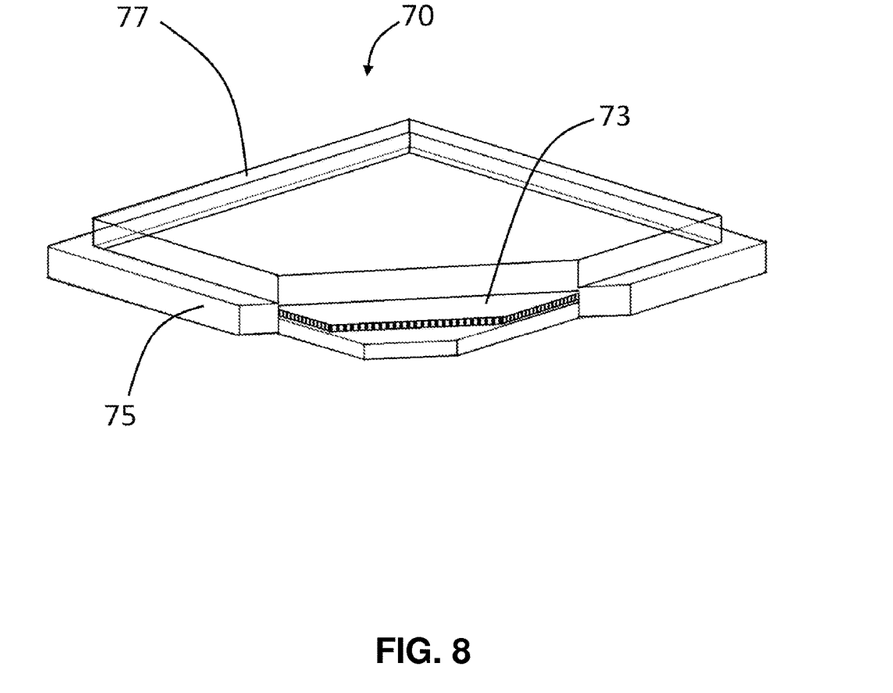
FIG. 8 shows one construction of a retroreflector for use in embodiments according to the disclosed subject matter.

FIG. 8 shows one possible embodiment of retroreflector 70 in which retroreflective sheet 73 is mounted in a recessed base 75. Base 75 may be material compatible with the requirements of an aseptic environment and resistant to the gases and vapors employed to render the interior of chamber 20 aseptic. By way of non-limiting example, one suitable material for base 75 is a metal, such as stainless steel, titanium, aluminum, or hastelloy. The metal can be coated or otherwise treated to provide a non-stick or decreased-stick surface, using, for instance, a hard anodizing process or other such treatment or coating processes. Retroreflective sheet 73 is covered by a transparent sheet 77 compatible with the requirements of an aseptic environment and resistant to the gases and vapors employed to render the interior of chamber 20 aseptic. By way of non-limiting example, one suitable material for transparent sheet 77 is glass. Sheet 77 may be sealed to base 75 by means of suitable adhesive. This construction ensures that retroreflector 70 is aseptically disposed within chamber 20. In another embodiment retroreflective sheet 73 may be located underneath the base of chamber 20 with transparent sheet 77 aseptically embedded within the base of chamber 20. In all contemplated arrangements, retroreflector 70 is aseptically disposed with respect to chamber 20, whether interior or exterior to chamber 20.

Figure 9:
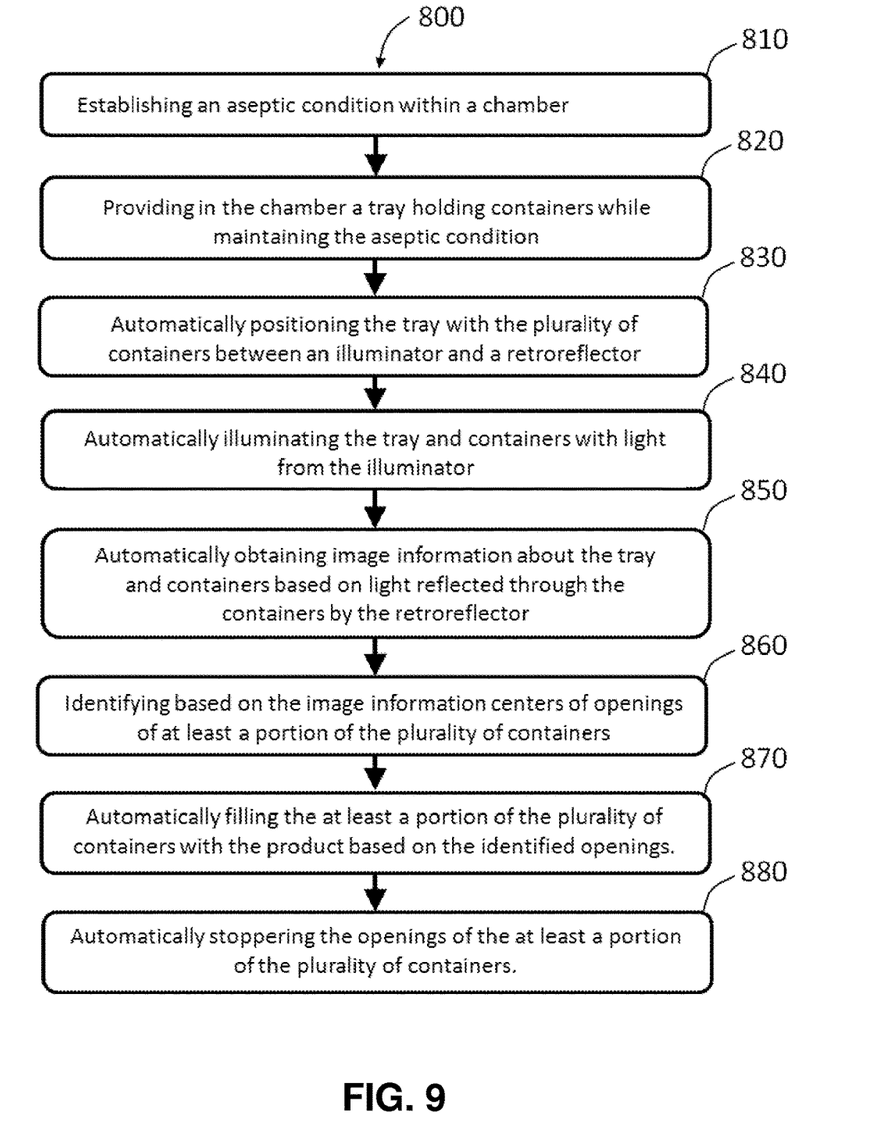
FIG. 9 shows a flowchart for a method for filling pharmaceutical containers according to the disclosed subject matter.

In another aspect, described at the hand of the flow chart in FIG. 9, a method [800] is provided for aseptically filling pharmaceutical containers with a product, the method comprising establishing [810] an aseptic condition within a chamber, maintaining [820] the aseptic condition while providing within the chamber a tray holding within openings in the tray a plurality of pharmaceutical containers, automatically positioning [830] the tray with the plurality of containers between an illuminator and a retroreflector, automatically illuminating [840] the tray and containers with light from the illuminator, automatically obtaining image information [850] about the tray and containers based on light reflected through the containers by the retroreflector, [860] identifying based on the image information centers of openings of at least a portion of the plurality of containers, and automatically filling [870] the at least a portion of the plurality of containers with the product based on the identified openings.

The method may further comprise automatically stoppering [880] the openings of the at least a portion of the plurality of containers. The automatically stoppering [880] may comprise operating an articulated stoppering arm to collect stoppers from known locations of stoppers, and operating the articulated stoppering arm to stopper the openings of the at least a portion of the plurality of containers.

The automatically illuminating [840] the tray and containers may comprise illuminating the tray and containers with substantially collimated light. The automatically positioning [830] the tray may comprise operating an articulated holding arm to automatically position the tray. The automatically positioning [830] the tray may be such that a planar surface of the tray is substantially perpendicular to the collimated light. The automatically filling [860] may comprise operating an articulated filling arm to automatically fill the at least a portion of the plurality of containers.

The automatically obtaining image information [850] may comprise imaging with a sensor disposed at a large enough distance from the retroreflector to collect largely the retroreflected light. In other embodiments, the automatically obtaining image information [850] may comprise imaging the tray and containers using a telecentric lens. The automatically obtaining image information [850] may in further implementations comprise imaging the tray and containers using a Fresnel lens and a fixed focal length lens. In using a Fresnel lens, the automatically illuminating [840] the tray and containers with light may comprise automatically illuminating the tray and containers with substantially monochromatic light.

Referring again to FIG. 3, an illuminator 15 may also be positioned under the tray. This can provide collimated light to the sensor 12 in addition to or instead of light received from above the tray. This lower illuminator may also be aseptically disposed in the floor of chamber 20 by, for example without limitation, disposing it behind a transparent window sealed aseptically to the floor of chamber 20, inside or outside the chamber. Filling systems can also be implemented with other combinations of the illuminating, sensing, and/or reflecting elements. One example of such a system can include a floor-mounted illuminator, a floor-mounted sensor, and a roof-mounted retroreflector.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system for aseptically filling a tray of pharmaceutical containers with a pharmaceutical product, comprising:
a chamber capable of maintaining an aseptic condition,
a sensor aseptically disposed with respect to the chamber, the sensor having a sensing cone within the chamber, the sensor having an associated light source illuminating the sensing cone,
an articulated filling arm and a tray of pharmaceutical containers disposed within the chamber, each of the articulated filling arm and the tray having a range of motion within the sensing cone,
a reflective surface positioned within the sensing cone, wherein the reflective surface includes a retroreflector disposed to reflect to the sensor light from the sensor light source, the sensor light impinging on the tray of pharmaceutical containers, the retroreflector having a retroreflective sheet aseptically disposed with respect to the chamber, the retroreflector having a transparent sheet disposed over the retroreflective sheet such that the retroreflective sheet is in optical communication within the sensing cone and is physically separated from the chamber by the transparent sheet; and
a controller in data communication with the sensor and with the filling arm and configured for:
obtaining image information from the sensor,
determining the locations of openings of the containers within the sensing cone based on the image information, and
automatically guiding the filling arm to fill the containers with the product based on the locations of openings of the containers.

2. The system of claim 1, wherein the light source is aseptically disposed with respect to the chamber.

3. The system of claim 1, further comprising an illuminator disposed to illuminate the retroreflector with substantially collimated light.

4. The system of claim 3, further comprising a holding arm for holding the tray, wherein:
the controller is in data communication with the holding arm, and
the controller is configured for automatically guiding, based on the image information, the holding arm to position the tray in a location in a light path between the illuminator and the retroreflector.

5. The system of claim 4, wherein the controller is configured for automatically guiding, based on the image information, the holding arm to position the tray such that a planar surface of the tray is substantially perpendicular to the collimated light.

6. The system of claim 3, wherein the sensor is disposed at a large enough distance from the retroreflector to collect largely the retroreflected light.

7. The system of claim 6, wherein the sensor comprises the illuminator and an imager, wherein the illuminator is disposed annularly about the imager.

8. The system of claim 3, wherein the sensor comprises an imaging detector, a fixed focal length lens, and a Fresnel lens.

9. The system of claim 8, wherein the illuminator provides substantially monochromatic light.

10. The system of claim 3, wherein the sensor comprises an imaging detector and a telecentric lens, wherein the imaging detector is disposed to receive the retroreflected light through the telecentric lens.

11. The system of claim 1, further comprising a stoppering arm for stoppering the containers, wherein:
the controller is in data communication with the stoppering arm, and
the controller is configured for automatically guiding, based on the image information, the stoppering arm to stopper the containers.

12. A method for aseptically filling pharmaceutical containers with a product, the method comprising
establishing an aseptic condition within a chamber,
maintaining the aseptic condition while providing within the chamber a tray holding within openings in the tray a plurality of pharmaceutical containers,
automatically positioning the tray with the plurality of containers in an illumination path of an illuminator, and positioning a retroreflector to reflect light impinging on the tray and containers, the retroreflector having a retroreflective sheet aseptically disposed with respect to the chamber, the retroreflector having a transparent sheet disposed over the retroreflective sheet such that the retroreflective sheet is in optical communication within the sensing cone and is physically separated from the chamber by the transparent sheet,
automatically directing light from the illuminator through the tray and containers,
automatically obtaining image information about the tray and containers based on light received through the containers,
identifying based on the image information centers of openings of at least a portion of the plurality of containers, and
automatically filling the at least a portion of the plurality of containers with the product based on the identified openings.

13. The method of claim 12, further comprising automatically stoppering the openings of the at least a portion of the plurality of containers.

14. The method of claim 13, wherein the automatically stoppering comprises:
operating an articulated stoppering arm to collect stoppers from known locations of stoppers, and
operating the articulated stoppering arm to stopper the openings of the at least a portion of the plurality of containers.

15. The method of claim 12, wherein the automatically illuminating the tray and containers comprises illuminating the tray and containers with substantially collimated light.

16. The method of claim 12, wherein the automatically positioning the tray comprises operating an articulated holding arm to automatically position the tray.

17. The method of claim 16, wherein the automatically positioning the tray comprises operating an articulated holding arm to automatically position the tray such that a planar surface of the tray is substantially perpendicular to collimated light from the illuminator.

18. The method of claim 12, wherein the automatically filling comprises operating an articulated filling arm to automatically fill the at least a portion of the plurality of containers.

19. The method of claim 12, wherein the automatically obtaining image information comprises imaging with a sensor disposed at a large enough distance from the retroreflector to collect mostly retroreflected light.

20. The method of claim 12, wherein the automatically obtaining image information comprises imaging the tray and containers using a telecentric lens.

21. The method of claim 12, wherein the automatically obtaining image information comprises imaging the tray and containers using a Fresnel lens and a fixed focal length lens.

22. The method of claim 21, wherein the automatically illuminating the tray and containers with light comprises automatically illuminating the tray and containers with substantially monochromatic light.

23. The method of claim 12, wherein the automatically positioning the tray with the plurality of containers places the tray between an illuminator and a reflective surface.

24. The method of claim 12, wherein the automatically positioning the tray with the plurality of containers places the tray between an illuminator and a retroreflector.

25. The method of claim 12, wherein the automatically illuminating takes place after the automatically positioning the tray.

26. A system for aseptically filling a tray of pharmaceutical containers with a pharmaceutical product, comprising:
    means for establishing an aseptic condition within a chamber,
    means for maintaining the aseptic condition while providing within the chamber a tray holding within openings in the tray a plurality of pharmaceutical containers,
    means for automatically positioning the tray with the plurality of containers in an illumination path of an illuminator, and positioning a retroreflector to reflect light impinging on the tray and containers, the retroreflector having a retroreflective sheet aseptically disposed with respect to the chamber, the retroreflector having a transparent sheet disposed over the retroreflective sheet such that the retroreflective sheet is in optical communication within the sensing cone and is physically separated from the chamber by the transparent sheet,
    means for automatically directing light from the illuminator through the tray and containers,
    means for automatically obtaining image information about the tray and containers based on light received through the containers,
    means for identifying based on the image information centers of openings of at least a portion of the plurality of containers, and
    means for automatically filling the at least a portion of the plurality of containers with the product based on the identified openings.

* * * * *